US011038849B1

(12) United States Patent
Alm

(10) Patent No.: US 11,038,849 B1
(45) Date of Patent: Jun. 15, 2021

(54) PRIVATE PROGRAMMABLE MESH NETWORK

(71) Applicant: Blastwave, Inc., Mountain View, CA (US)

(72) Inventor: Peter Alm, Träslövsläge (SE)

(73) Assignee: BlastWave, Inc., Mountain View, CA (US)

( * ) Notice: Subject to any disclaimer, the term of this patent is extended or adjusted under 35 U.S.C. 154(b) by 0 days.

(21) Appl. No.: 15/930,005

(22) Filed: May 12, 2020

Related U.S. Application Data

(60) Provisional application No. 62/847,162, filed on May 13, 2019.

(51) Int. Cl.
*H04L 29/06* (2006.01)
*H04L 9/08* (2006.01)
*H04L 9/32* (2006.01)

(52) U.S. Cl.
CPC ........ *H04L 63/0428* (2013.01); *H04L 9/0819* (2013.01); *H04L 9/3213* (2013.01); *H04L 63/029* (2013.01)

(58) Field of Classification Search
None
See application file for complete search history.

(56) References Cited

U.S. PATENT DOCUMENTS 9,774,401 B1 * 9/2017 Borrill ................ H04L 9/0852
2007/0189249 A1 * 8/2007 Gurevich .......... H04W 12/0401
370/338

* cited by examiner

*Primary Examiner* — Brandon S Hoffman
(74) *Attorney, Agent, or Firm* — Jeffrey Pearce

(57) ABSTRACT

A networked system has a plurality of nodes, each of which is configured for secure, encrypted communication of data over a general network. Protected devices communicate with the general network only via a respective associated one of the nodes and are network-addressable only via its associated node. Each node can automatically discover the presence of the other nodes, determine data communication routes to the other nodes, and establish point-to-point tunnels between themselves and selected ones of the other nodes, over which tunnels the protected devices may communicate with each other. The nodes and protected devices are thus organized as a mesh such that the protected devices are undetectable and unaddressable via the general network by entities external to the mesh.

4 Claims, 3 Drawing Sheets

PRIVATE PROGRAMMABLE MESH NETWORK

CROSS-REFERENCE TO RELATED APPLICATIONS

This application claims priority of U.S. Provisional Patent Application No. 62/847,162 ("Secure Mesh Network Architecture") filed 13 May 2019.

TECHNICAL FIELD

This invention relates to the security of devices that communicate over networks.

BACKGROUND

Virtual private networks (VPNs) protect LAN-to-LAN (LAN: Local Area Network) communications, and communications from a remote device to the LAN. FIG. 1 illustrates such a conventional arrangement, in which devices 20 access a network such as the Internet 30 via VPN gateways 10. The devices 20 may communicate either directly with their respective gateway 10, or with them and other devices behind the same gateway via any conventional local area network (LAN) 40. As FIG. 1 illustrates by solid vs. dashed lines, traffic behind a gateway 10 may be unprotected (dashed lines), whereas traffic between the gateways and external entities may be protected (solid lines).

One of the security limitations of this configuration is that when a LAN, or even any one device on the LAN, is compromised, any communication within the LAN can be eavesdropped ("passive attack") on. In an "active attack", the devices themselves may be targeted, attacked and then controlled. VPNs also require network configuration (which is subject to error), and for the virtual network perimeter to be defined at the time the network is configured (i.e., which devices are inside or outside the network).

DETAILED DESCRIPTION

This invention provides a cryptographically secure private mesh network of nodes that create a secure, programmable IP layer over any existing packet-based infrastructure such as, but not limited to, the Internet. The general concept and architecture of a mesh network (sometimes called a "meshnet") are known; novel features provided by embodiments of this invention, however, are described below.

When deployed, mesh nodes automatically discover mesh peers and self-organize, thereby eliminating the need for configuration. All nodes within the mesh may be aware of peers and of routes across the mesh.

When deployed, the mesh network is invisible to external systems and cannot be detected or connected to. Access control and visibility across the entire mesh network is programmable and controlled by policy. Access between any two or multiple devices (or systems) within the mesh can be granted or revoked instantaneously.

This then provides secure encrypted network connectivity to existing computers and computing devices (for example, "Edge" or "End" devices) whose communications pass through the nodes.

Figure 1:
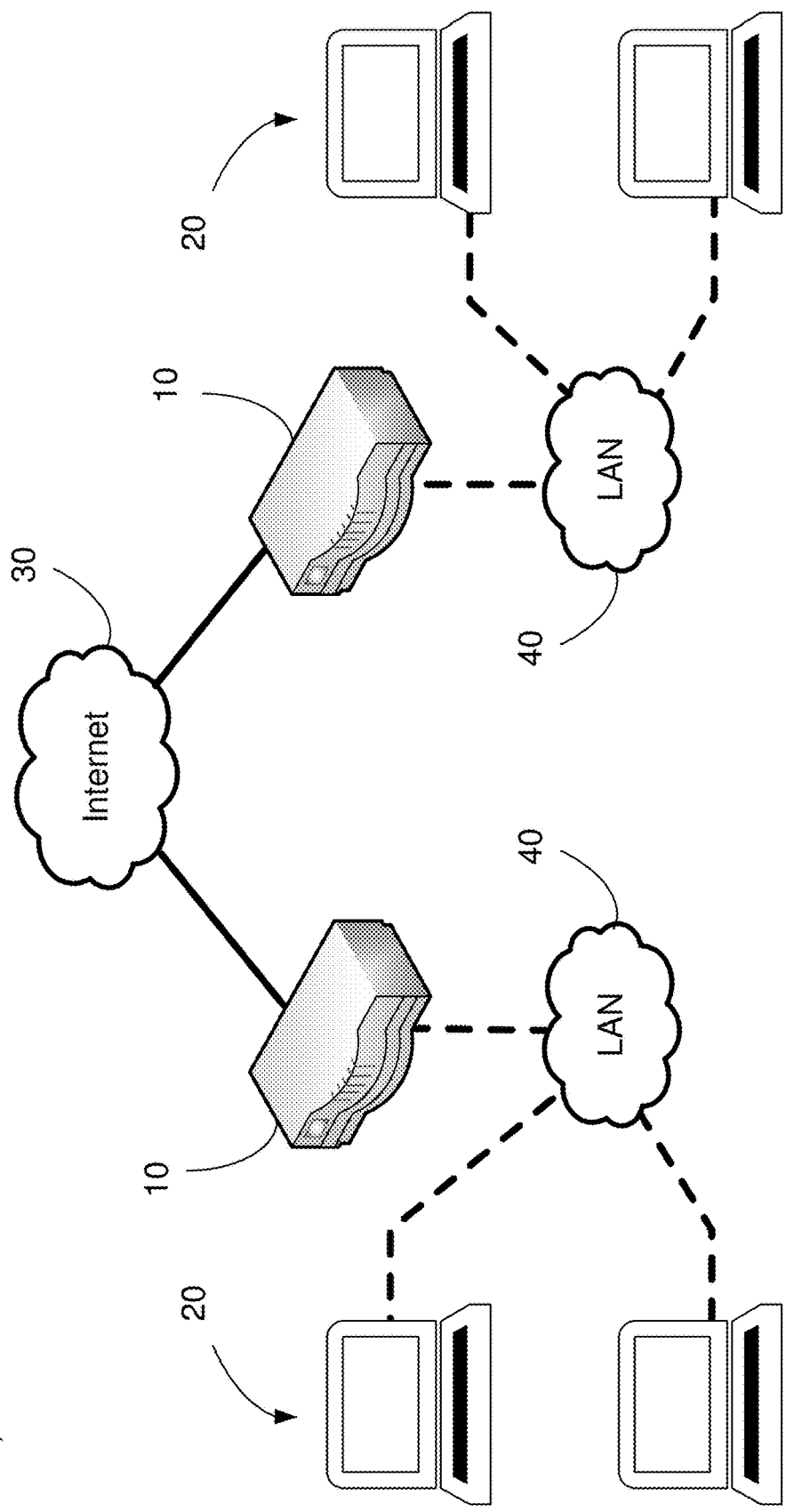
FIG. 1 illustrates a prior art arrangement in which digital devices communicate with a network via local area networks and VPN gateways.
Figure 2:
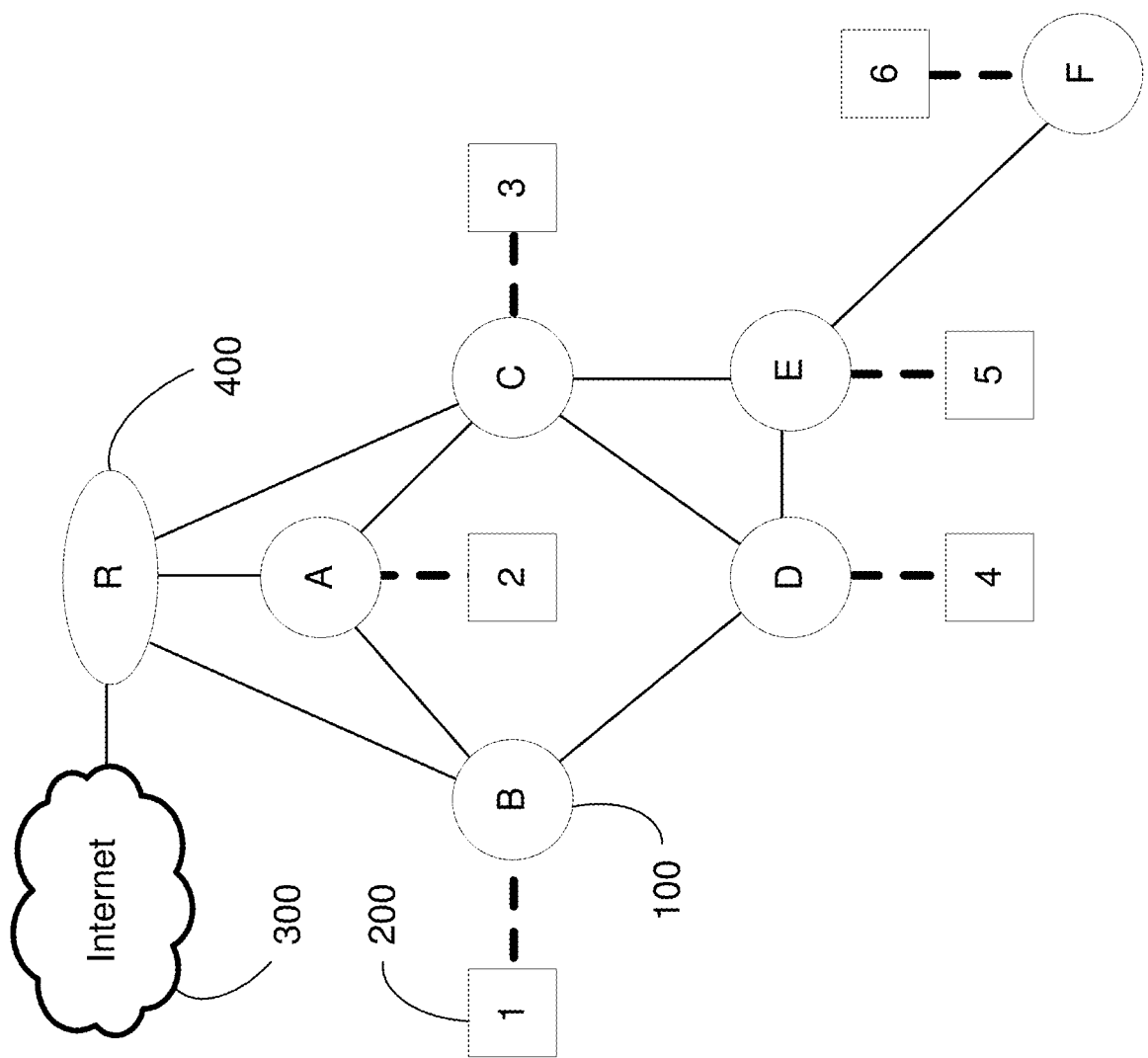
FIG. 2 illustrates how a variety of end devices may be protected using embodiments of the invention.

See FIG. 2, which shows an example of different entities in one example of a mesh topology configured to provide a network ("Secure Network") that is cryptographically separated from any other network, and that provides end device-to-end device security by architectural design. The principle components in the illustrated embodiment are:

Secure Devices 100, also referred to here as "nodes", are shown as "circles" A-F. Secure Devices may be implemented, for example, as secure routers, servers, etc.

Protected End Devices 200, shown as "squares" 1-6, which may be any type of computing device that is capable of digital communication, for example, a desktop or laptop computer, network printer, IoT controller, IoT sensor, etc. Each Protected End Device is associated with one of the Secure Devices.

An optional Secure Router (R) 400 may be included to form a special Secure Device to which the nodes connect for the purposes of initial setup and configuration.

In FIG. 2, connections that need not be secure, and may be wired, are shown as dashed lines, whereas secure network connections are indicated with solid lines. Some examples of known systems for digital connectivity include wired Ethernet, USB, RS-485, RS-232, IEEE-488, or any other known arrangement.

Secure Devices form a mesh network, within which they can communicate with each other over a LAN or WAN (Wide Area Network), including over the Internet. However, when communicating over a WAN, for example, the Internet, the Secure Devices are isolated from communication with any other device connected to the Internet. In other words, the Secure Devices, and thus the devices they protect, are made inaccessible to outside users of the Internet.

Each Secure Device 100 protects its corresponding Protected End Device 200 from cyber attacks in the following ways:

Protected Devices not Addressable for Attack

The Protected Devices 200 are "virtually air-gapped" to the outside of the Secure Network, in that their access to the outside may take place only through Secure Devices 100, which allow no direct access and do not expose the Protected Devices logically outside of the Secure Network. Attackers are thus not able even to address Protected Devices for attack.

Embodiments may provide a two-level defense against attack. First, the protected entities sit physically behind their respective nodes, which isolate them from even being addressed by an outsider. Second, when running on an IP network, the nodes will not respond at all to any packets that they cannot cryptographically verify is from another known node of the network.

Inter-node awareness may be arranged by an entity in the network, such as a secure router (acting as a Secure Device) or an administrative entity, maintaining a list of known nodes that are allowed to be on the network. In the list may be stored a public key for each node. Using a tunnel setup handshake procedure, each node will expect messages to be signed using the private key that matches the public key on that list for the node it is talking to, and will not accept the messages otherwise. During this handshake the nodes may also exchange temporary PKI (public key infrastructure) key pairs and from these temporary key pairs, derive a shared secret, for example using the known Diffie-Hellman key exchange protocol. That derived secret may then be expanded into more bits using a KDF (key derivation function). These bits may then be used as the symmetric session keys, one for each direction of the tunnel. One example of a symmetric cipher that may be used in AES-GCM, which allows authentication of each message to make sure it's really encrypted using the agreed-upon key and hasn't been tampered with.

Elimination of Configuration Errors and Weaknesses

When setting up a Secure Network, the Secure Devices automatically and securely join the network, which the Secure Devices create, with no configuration or authentication information. In particular, when the Secure Devices are manufactured, they each generate a unique public/private keypair. The private key is never revealed, but the public key is digitally signed by the main system administrator, and stored encrypted on the device. This signed public key may then be used later to validate (only) that Secure Device as legitimate. Information about all connected nodes may optionally be stored for access by the administrator, who will then have a registry of all currently connected nodes.

When the Secure Device attempts to join the network, it is then cryptographically challenged to prove that it is a legitimate Secure Device, and must show that it can digitally sign a challenge sent by the network. (See further "Registration" below.) In the prior art, users must provide configuration information when adding devices to a network. This configuration information has been a source of security weakness; for example, many network routers have been deployed with default usernames and passwords. These provisioning vulnerabilities are eliminated with the self-provisioning capabilities of the Secure Devices according to this invention. Only the Secure Devices need configuration information, and that is only to join the local network, and the critical part of their configuration information, that is, their device identification credentials, is unique, encrypted, and never disclosed outside of a "Secure Hardware Root of Trust"; therefore, the physical "Secure Device" becomes a factor of the Secure Network credentials.

Secure Devices have a "Secure Hardware Root of Trust," wherein the device boots from a secure, encrypted bootloader to a known, secure state. The bootloader loads an encrypted operating system (OS) kernel from storage, cryptographically validates it (using any known digital signature scheme), then decrypts and executes it. In turn, the OS kernel reads any additional software from secure storage, cryptographically validates it, then decrypts and executes it. This assures that any software run on the device has been authorized by the network owner.

Some Secure Devices may be configured using known techniques to require biometric identification before allowing the Secure Device to join the network. These Secure Devices may use any combination of biometric, behavioral, and/or social analysis ("Digital DNA"), or other heuristics, enabling passive non-forgeable identification.

Mesh Tunnels

Secure Devices are nodes that create a Mesh of tunnels, in contrast to the prior art's hub-and-spoke architecture. This allows for secure communication between Protected Devices that have no traditional direct path of communication, using hopping between Secure Devices to form a new path of communication that previously didn't exist. Embodiments also include a dynamic feature of automatically extending the mesh tunnel footprint with every additional user who connects and authenticates to the network.

Self-Healing

Because each Secure Device can join the Secure Network with no configuration information, the Secure Network has a self-healing capability. If a Secure Device loses connectivity to the rest of the Secure Network, it can rejoin the Secure Network automatically and seamlessly. This is in contrast to traditional failover schemes, where an administrator must pre-configure a backup network path, which is subject to error, and which error is often discovered only at the moment of need. Using this invention, transmission and transactions automatically find other paths, thereby providing 100% continuity of services.

Transport Protocol Agnostic

The Secure Network is transport protocol agnostic (e.g., satellite, WiFi, Ad-hoc WiFi Meshes, Ethernet, BlueTooth, LTE, 5G). The Secure Network may be created on top of any reasonable underlying transport mechanism. All traffic over that transport may be encrypted and opaque to potential eavesdroppers, and protected from forgery by potential active attackers. There is no requirement for any TCP/IP infrastructure to exist on the transport network.

Traffic Rules for Quarantine

Because Secure Devices preferably protect exactly one Protected End Device, the Secure Device may use known machine learning techniques to create a profile of "normal" network traffic for that particular Secure Device, and raise security alerts or block traffic until the device is re-authorized.

Registration

Certain Secure Devices may perform additional functions, including registration of Secure Devices. Here, "registration" means that a Secure Device is issued a cryptographically secure and unique token that allows it to communicate on the Secure Network. The same set of devices may whitelist ("pre-register") or blacklist (forbid from joining) Secure Devices.

As mentioned above, nodes in the mesh may automatically discover mesh peer nodes and self-organize. In one embodiment, this was accomplished using a cloud-hosted Lighthouse server (central management software, supplied by the company Opengear as a software appliance, in particular, as a virtual machine) that allows participating nodes to map their network ID (given to them during registration onto the network) to a list of network entry points. From these entry points the nodes can then query and lookup the rest of their peers. They may then, if needed or desired, create point-to-point tunnels to the peers on demand, based on the communication needs of the protected entities. The Lighthouse server need contain only a map of the entry points to the network. Once a node has successfully connected into one of these entry points it can then get enough information from that node to compile its own map on how to get to the other nodes of the network.

This feature also enables communication between protected entities that are isolated behind different nodes. Although the invention thus allows protected entities to be protected from external attack (external entities are not even aware of them), protected entities themselves may thus interact with each other as if they were on a single local area network.

Policy Enforcement

Policies are enforced by each individual Secure Device, such that there is no way to circumvent it as compared with the vulnerability of centralized policy administration. The Protected End Device may have a mechanism to enable a user to log in and change software or configurations, similar to implementing VPN encryption on a device. These software or configuration changes may easily be made insecure by inadvertent modification. By contrast, the Secure Device has no mechanism for the user to modify anything in it; therefore, the Secure Device can't be accidentally (or intentionally) rendered insecure. Note that a previously compromised End Device cannot be fully protected after the fact; however, its malicious activities will be limited to only operations that its associated Secure Device allows, and its communications can be isolated to its authorized path.

Figure 3:
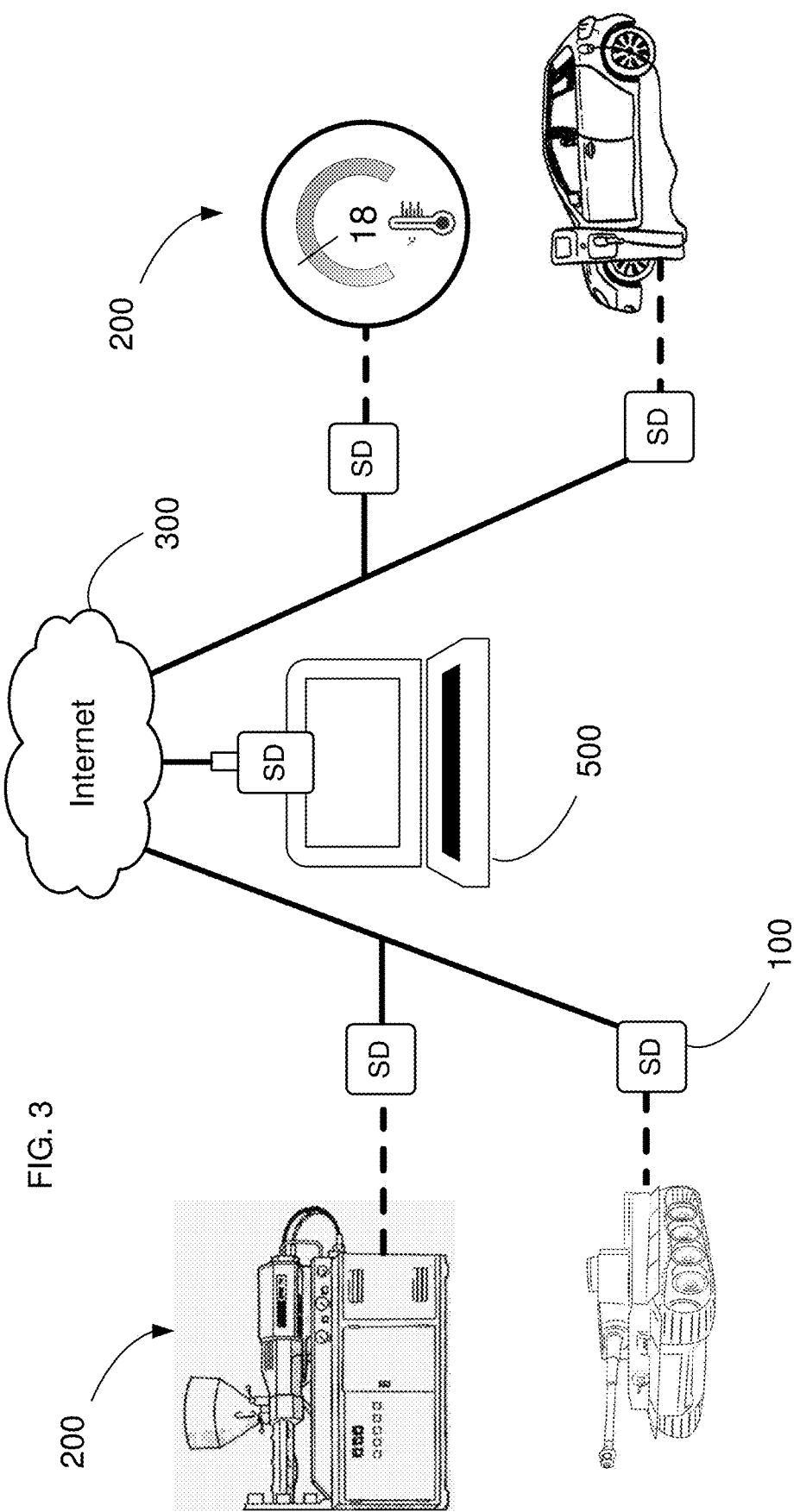
FIG. 3 illustrates a simple example of the "mesh" nature of the network according to embodiments of the invention.

FIG. 3 illustrates how different types of End Devices 200 (the computing systems within manufacturing, military communication, smart devices (a thermostat is shown), security/control devices, as such a few of the practically unlimited possibilities) may communicate with other End Devices, but only via respective associated Secure Devices SD 100.

A standard computer (shown as a laptop), may similarly be provided with an authentication device such as a fob, dongle, interface card, etc., programmed to perform the functions of a Secure Device. In this embodiment, the protected end device(s) may comprise software components, modules, simulation applications, virtual machines, or other processes running within the computer, or peripheral devices connected to it.

Thus, each End Device is able to pass information to other End Devices, but not directly; rather, all such communication must pass via a Secure Device, which isolates its associated End Device from all direct communication. All traffic through the Secure Devices is preferably encrypted.

See FIG. 2 again for an illustration of one simple example of the "mesh" nature of the network according to embodiments of the invention. When two nodes in the network can't reach each other directly, but can reach a mutual other node, the mutual node may forward traffic between the two nodes that can't reach each other directly. For example, assume that node D can reach nodes B, C, and E. Because nodes B and C may forward messages to and from node D, node D can join and remain on the network even if either of node B or node C were to fail or otherwise become inaccessible, and regardless of the status of node E or otherwise become inaccessible. Because the nodes of our mesh require no configuration to join (or rejoin) the network securely, it is much easier to set up initially, and there are no error-prone configurations (see items 6 and 2 above).

What is claimed is:

1. A networked system comprising:
   a plurality of nodes, each node being configured for secure, encrypted communication of data over a general network;
   a plurality of protected devices configured to communicate with the general network only via a respective associated one of the nodes and being network-addressable only via its associated node;
   a map of network IDs assigned to nodes upon registration in the networked system and of network entry points of the nodes, said nodes being configured to securely access the map to determine the presence and network entry points of other ones of the nodes;
   each said node being provided for automatically discovering the presence of the other of the plurality of nodes, for determining data communication routes to the other of the plurality of nodes, and for establishing point-to-point tunnels between themselves and selected ones of the other nodes, over which tunnels the protected devices may communicate with each other;
   the plurality of nodes and protected devices thereby being organized as a mesh such that the protected devices are undetectable and unaddressable via the general network by entities external to the mesh.

2. The system of claim 1, each said node, upon registration in the networked system, being uniquely associated with cryptographic token that is required for communication with other nodes.

3. The system of claim 1, said nodes being configured, using a handshake procedure, to exchange cryptographic keys with other nodes with which they are to communicate and to accept only messages properly encrypted according to the cryptographic keys of the node associated with each message.

4. The system of claim 1, in which, when a first one of the nodes is to communicate data to a second one of the nodes, but direct communication between the first and second nodes becomes unavailable, the first node is provided for establishing secure communication with at least a third one of the nodes via which it communicates with the second node.

* * * * *